US010148973B2

(12) United States Patent
Narasimhan

(10) Patent No.: US 10,148,973 B2
(45) Date of Patent: *Dec. 4, 2018

(54) CARRIAGE SYSTEMS ENCODING OR DECODING JPEG 2000 VIDEO

(71) Applicant: ARRIS Enterprises LLC, Suwanee, GA (US)

(72) Inventor: Mandayam Narasimhan, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/782,916

(22) Filed: Oct. 13, 2017

(65) Prior Publication Data
US 2018/0103262 A1 Apr. 12, 2018

Related U.S. Application Data

(63) Continuation of application No. 15/071,873, filed on Mar. 16, 2016, now Pat. No. 9,819,955, which is a (Continued)

(51) Int. Cl.
H04N 19/44 (2014.01)
H04N 7/52 (2011.01)
(Continued)

(52) U.S. Cl.
CPC ............. H04N 19/44 (2014.11); H04N 7/52 (2013.01); H04N 19/467 (2014.11);
(Continued)

(58) Field of Classification Search
None
See application file for complete search history.

(56) References Cited

U.S. PATENT DOCUMENTS 5,235,618 A 8/1993 Sakai et al.
5,461,420 A 10/1995 Yonemitsu et al.
(Continued)

FOREIGN PATENT DOCUMENTS

CN 102547299 A 7/2012
WO 2011/075548 A1 6/2011

OTHER PUBLICATIONS

Marcellin, Michael W., Michael J. Gormish, Ali Bilgin, and Martin P. Boliek, "An Overview of JPEG-2000", Proc. of IEEE Data Compression Conference, pp. 523-541, 2000.
(Continued)

Primary Examiner — Janese Duley
(74) Attorney, Agent, or Firm — Lori Anne D. Swanson

(57) ABSTRACT

A system configured to decode video data in a packetized elementary stream (PES) including frames of image data. The system includes a processor configured to receive a transport stream including control information associated with the image data including video metadata parameters associated with application specific functions applicable to the image data. The processor is also configured to receive the PES including the frames of image data in video access units. The processor is configured to retrieve and decode the retrieved video access units using the control information to form a signal including the frames of image data. The system also includes a storage device configured to store the frames of image data and the control information.

22 Claims, 6 Drawing Sheets

Related U.S. Application Data continuation of application No. 14/069,968, filed on Nov. 1, 2013, now Pat. No. 9,525,885, which is a continuation of application No. 12/967,748, filed on Dec. 14, 2010, now Pat. No. 8,599,932.

(51) Int. Cl.

| | | |
|---|---|---|
| *H04N 21/235* | (2011.01) | |
| *H04N 21/236* | (2011.01) | |
| *H04N 21/435* | (2011.01) | |
| *H04N 21/84* | (2011.01) | |
| *H04N 21/845* | (2011.01) | |
| *H04N 19/467* | (2014.01) | |
| *H04N 19/70* | (2014.01) | |
| *H04N 21/434* | (2011.01) | |

(52) U.S. Cl.
CPC .......... *H04N 19/70* (2014.11); *H04N 21/235* (2013.01); *H04N 21/236* (2013.01); *H04N 21/435* (2013.01); *H04N 21/4343* (2013.01); *H04N 21/84* (2013.01); *H04N 21/8451* (2013.01)

(56) References Cited

U.S. PATENT DOCUMENTS

| | | | |
|---|---|---|---|
| 5,461,421 A | 10/1995 | Moon | |
| 6,262,775 B1 | 7/2001 | Kim | |
| 6,307,973 B2 | 10/2001 | Nishikawa et al. | |
| 2002/0133546 A1* | 9/2002 | Liang | G06F 9/54 |
| | | | 709/204 |
| 2006/0067400 A1 | 3/2006 | Zhang | |
| 2006/0182418 A1 | 8/2006 | Yamagata et al. | |
| 2007/0002041 A1 | 1/2007 | Kim et al. | |
| 2007/0121620 A1 | 5/2007 | Yang et al. | |
| 2008/0095235 A1 | 4/2008 | Hsiang | |
| 2008/0172703 A1* | 7/2008 | Kim | H04N 7/163 |
| | | | 725/105 |
| 2008/0273533 A1* | 11/2008 | Deshpande | H04L 47/564 |
| | | | 370/392 |
| 2009/0268805 A1 | 10/2009 | Shanableh et al. | |
| 2010/0086285 A1* | 4/2010 | Sasaki | G11B 27/105 |
| | | | 386/212 |
| 2011/0274176 A1 | 11/2011 | Panusopone et al. | |
| 2012/0082234 A1 | 4/2012 | Lou et al. | |
| 2012/0082235 A1 | 4/2012 | Lou et al. | |
| 2013/0002812 A1 | 1/2013 | Bhat et al. | |

OTHER PUBLICATIONS

Narashimhan, S., et al., Transport of JPEG 2000 part 1 video (ITU-T Rec 800 ISO/IEC 15444-1) over ITU-T Rec H.222.01, ISO/IEC 13818-1, proposed Amendment 5, Oct. 26, 2009.

"Information Technology—Generic Coding of Moving Pictures and Associated Audio information: Systems", 2nd edition, International Standard ISO/IEC 13818-1, Dec. 2000.

"Information Technology—JPEG 2000 Image Coding System, Part 1: Core Coding System", 1st edition, International Standard ISO/IEC 15444-1, Dec. 2000.

Information Technology—JPEF 2000 Image Coding System: Extensions for Three-Dimensional Data, Telecommunication Standardization Sector of ITU, ITU-T Recommendation T.809, ISO/IEC 15444-10, Aug. 2007.

\* cited by examiner

CARRIAGE SYSTEMS ENCODING OR DECODING JPEG 2000 VIDEO

CLAIM OF PRIORITY

The present application is a continuation of U.S. patent application Ser. No. 15/071,873 filed on Mar. 16, 2016 ("Parent Application"), which is a continuation of U.S. patent application Ser. No. 14/069,968, filed Nov. 1, 2013, which is a continuation of U.S. patent application Ser. No. 12/967,748, filed Dec. 14, 2010, and which claims the benefit of priority to U.S. Provisional Patent Application Ser. No. 61/287,759, filed on Dec. 18, 2009, entitled Carriage of JPEG 2000 Part 1 Video Over MPEG-2 Transport Streams, by Mandayam A. Narasimhan, the disclosures of which are hereby incorporated by reference in their entirety.

BACKGROUND

Communication networks are often the medium through which digital content distributors transmit protected content. Communications protocols and content formatting standards have been developed which standardize how certain types of protected content are conveyed over various types of communication network architectures. However, new technologies are emerging with respect to the communications systems used, the content formatting standards applicable with new types of content, and the network architectures which may be utilized by the distributing and/or receiving parties of the protected content.

Given the ongoing changes in the technologies used in distributing and viewing protected content, currently available protocols and standards are often not adequate or operable for attaining acceptable interoperability among systems using different protocols or content formatted according to different standards. Furthermore, as new protocols for communication networks and/or new standards for new content formats are implemented to accommodate changes in technology, existing protocols or standard may not be adequate to fully or even partially implement the changes in technology.

In the case of video-based protected content, especially those which rely on high efficiency compression methods to enable transport through communications networks, the need for interoperability among new technologies, new protocols and new standards is especially high. This is partly due to the wide variety of technical options constantly being developed for packaging video-based protected content for distribution. It is also due to the wide variety of usage options being developed and deployed for the end consumers of video-based protected content.

BRIEF SUMMARY OF THE INVENTION

The disclosure presents encoding and decoding systems and methods which overcome the described drawbacks associated with attaining interoperability among new technologies, new communications protocols and new content formatting standards for video-based protected content, especially those which rely on high efficiency compression methods to enable transport of the video-based protected content through communications networks. This is partly due to the wide variety of technical options constantly being developed for packaging video-based protected content for distribution. It is also due to the wide variety of usage options developed and deployed for the end consumers of the video-based protected content.

According to an embodiment, the content formatting standard is JPEG 2000 Part1 (J2K), an image compression standard and coding system developed by the Joint Photographic Experts Group committee. According to another embodiment the communications protocol is MPEG-2 Part 1 Systems Section, a standard for the generic coding of moving pictures and associated audio information developed by the Moving Pictures Expert Group. According to another embodiment, the content formatting standard is J2K and the communications protocol is MPEG-2 Part 1 Systems Section as described in International Standard—ITU-T Recommendation—Information Technology—Generic Coding of Moving Pictures and Associated Audio Information Systems—Amendment 5: Transport of JPEG 2000 Part 1 (ITU-T Rec T.800|ISO/IEC 15444-1) video over ITU-T Rec H.222.0|ISO/IEC 13818-1 (ISO/IEC JTC1/SC29/WG11/N11364) (July 2010, Geneva, Switzerland), the disclosure of which is hereby incorporated by reference in its entirety.

According to a first embodiment is a system configured to encode frames of image data from an incoming signal into video data in a packetized elementary stream (PES). The system includes a processor configured to receive a signal including the frames of image data and control information associated with the image data including video metadata parameters associated with application specific functions applicable to the image data. The processor is also configured to encode the frames of image data to form video access units. Each video access unit includes an elementary stream (ELSM) header including image data metadata parameters associated with decoding and displaying the image data, a PES header including timing reference information including a presentation time stamp (PTS), and one or more codestreams associated with a frame of the image data. The processor is also configured to map the video access units into PES packets using the PTS in the PES header of the respective video access units, and order the PES packets in a monotonic order using the PTS in the PES packets to form a PES in a transport stream including the control information. The system also includes a storage device configured to store the frames of image data, and the control information.

According to a second embodiment is a method of encoding video data in a PES including frames of image data. The method includes receiving a signal including the frames of image data and control information associated with the image data including video metadata parameters associated with application specific functions applicable to the image data. The method also includes encoding the frames of image data to form video access units, each video access unit including an ELSM header including image data metadata parameters associated with decoding and displaying the image data, a PES header including timing reference information including a PTS, and one or more codestreams associated with a frame of the image data. The method also includes mapping the video access units into PES packets using the PTS in the PES header of the respective video access units and ordering the PES packets in a monotonic order using the PTS in the PES packets to form a PES in a transport stream including the control information.

According to a third embodiment is a non-transitory computer readable medium storing computer readable instructions that when executed by a computer system perform a method of encoding video data in a PES from frames of image data. The method includes receiving a signal including the frames of image data and control information associated with the image data including video metadata parameters associated with application specific functions applicable to the image data. The method also includes encoding the frames of image data to form video access units, each video access unit including an ELSM header including image data metadata parameters associated with decoding and displaying the image data, a PES header including timing reference information including a PTS, and one or more codestreams associated with a frame of the image data. The method also includes mapping the video access units into PES packets using the PTS in the PES header of the respective video access units and ordering the PES packets in a monotonic order using the PTS in the PES packets to form a PES in a transport stream including the control information.

According to a fourth embodiment is a system configured to decode video data in a PES including frames of image data. The system includes a processor configured to receive a transport stream including control information associated with the image data including video metadata parameters associated with application specific functions applicable to the image data and the PES, wherein the PES includes the frames of image data in video access units. Each video access unit includes an ELSM header including image data metadata parameters associated with decoding and displaying the image data, a PES header including timing reference information including a PTS, and one or more codestreams associated with a frame of the image data. The processor is configured to retrieve each video access unit present according to a monotonic order determined from the PTS in the PES header of the video access unit and decode the retrieved video access unit using the control information to form a signal including the frames of image data. The system also includes a storage device configured to store the frames of image data and the control information.

According to a fifth embodiment is a method of decoding video data in a PES including frames of image data. The method includes receiving a transport stream including control information associated with the image data including video metadata parameters associated with application specific functions applicable to the image data and the PES, wherein the PES includes the frames of image data in video access units. Each video access unit includes an ELSM header including image data metadata parameters associated with decoding and displaying the image data, a PES header including timing reference information including a PTS, and one or more codestreams associated with a frame of the image data. The method also includes retrieving each video access unit present in a monotonic order associated with the PTS in the PES header of the video access unit and decoding the retrieved video access unit using the control information to form a signal including the frames of image data.

According to a sixth embodiment is a non-transitory computer readable medium storing computer readable instructions that when executed by a computer system perform a method of decoding video data in a PES including frames of image data. The method includes receiving a transport stream including control information associated with the image data including video metadata parameters associated with application specific functions applicable to the image data and the PES, wherein the PES includes the frames of image data in video access units. Each video access unit includes an ELSM header including image data metadata parameters associated with decoding and displaying the image data, a PES header including timing reference information including a PTS, and one or more codestreams associated with a frame of the image data. The method also includes retrieving each video access unit present in a monotonic order associated with the PTS in the PES header of the video access unit and decoding the retrieved video access unit using the control information to form a signal including the frames of image data.

BRIEF DESCRIPTION OF DRAWINGS

Embodiments are described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

1. Content Distribution System

Figure 1A:
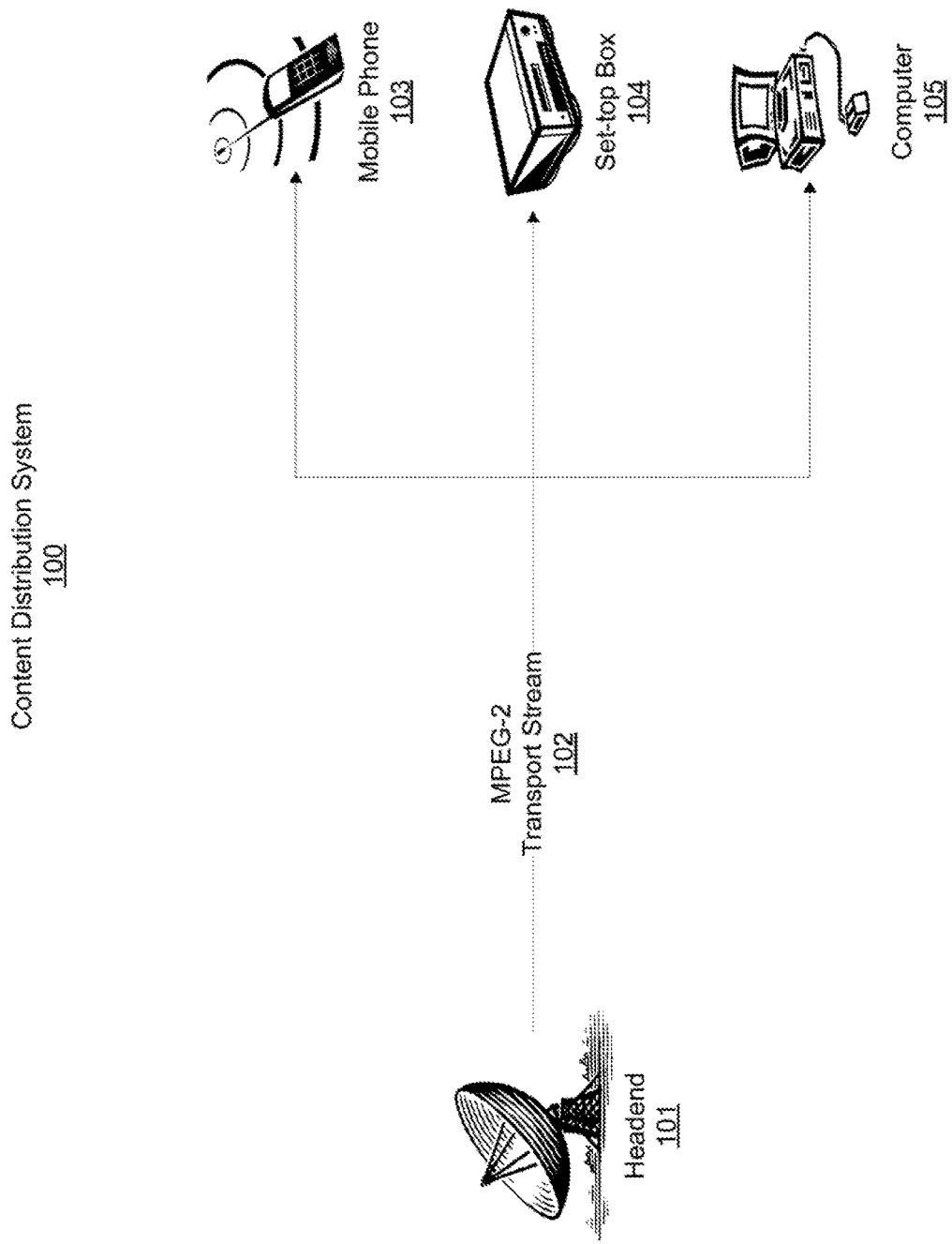
FIG. 1A is a system context diagram illustrating a content distribution system 100, according to an embodiment.

In a content distribution system (CDS), such as the CDS 100 illustrated in FIG. 1A, a content distribution facility, such as a headend 101, may be used to package and distribute protected content, such as video-based content. The video-based content may be packaged and transmitted, for example, via an MPEG-2 transport stream 102. The MPEG-2 transport stream 102 may include a plurality of video and audio streams associated with different data formats and programs provided through the CDS 100 to various types of client premises equipment (CPE) and client devices such as, for example, a cell phone 103, a set-top box 104 and a computer 105. Other CPEs and client devices may include multimedia devices (e.g., digital cameras, personal digital assistants, mobile phones, color facsimile, printers, scanners, etc).

Figure 1B:
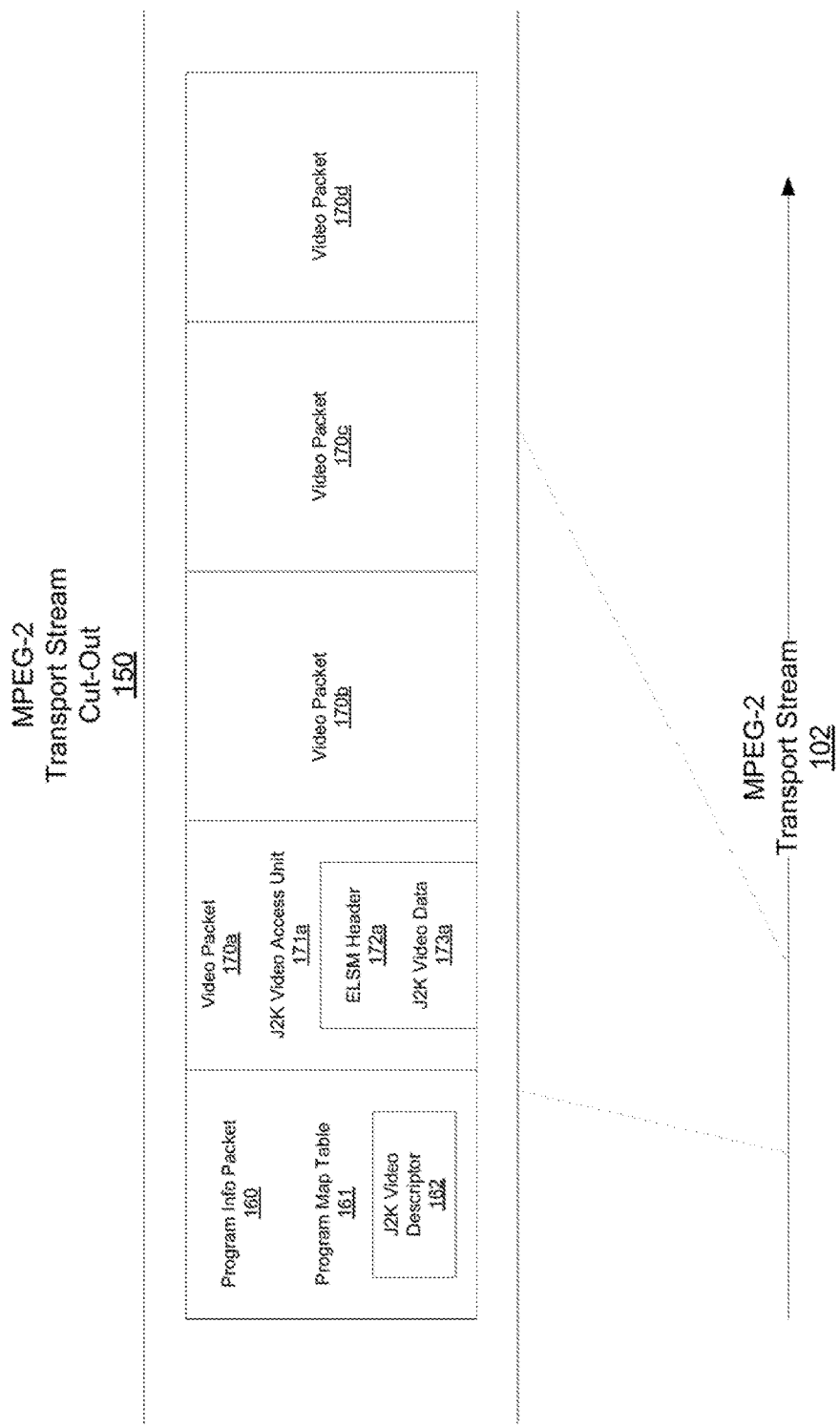
FIG. 1B is a breakout frame of an MPEG-2 transport stream 102 shown in FIG. 1A and illustrating encoded packets carried in the MPEG 2 transport stream 102, according to an embodiment.

The MPEG-2 transport stream includes different types of packetized information as illustrated in FIG. 1B. FIG. 1B shows an MPEG-2 transport stream cut out 150 of the MPEG-2 transport stream 102 shown in FIG. 1A. The MPEG-2 transport stream 102 may include a PES which are the video packets 170a to 170d and the program information packet 160, according to an embodiment. The program information packet 160 includes control information to reference one or a plurality of video packets, such as video packets 170a to 170d. The program information packet 160 includes control information, such a program map table 161 including a J2K video descriptor 162 to reference the video packets 170a to 170d. The J2K video descriptor 162 includes information describing what types of J2K video data, such as J2K video data 173a, may be included in a video packet, such as video packet 170a, and how the J2K video data is used, such as use in a still picture, a slide show or as frames of video in a J2K video sequence used in a program specified within the program map table 161. In another embodiment, a PES may include only video packets which may be referenced by control information, such as the information in the J2K video descriptor 162, which is not located in a program information packet associated with a PES in a transport stream but is instead located elsewhere in the transport stream including the PES.

The video packets in the PES illustrated in FIG. 1B include video packets 170a to 170d. Video packet 170a is representative of the other video packets 170b to 170d. It includes a J2K video access unit 171a. The J2K video access unit 171a includes an ELSM header 172a and J2K video data 173a, such as encoded J2K image data for a single a frame, such as a J2K still picture or a frame in a J2K video sequence.

The program information packet 160 includes control information for managing and/or using the video packets 170a to 170d. The program information packet 160 associated with video packet 170a includes a program map table 161 which includes the J2K video descriptor 162. The information in the J2K video descriptor 162 is used to direct usage of the J2K access unit 171a in the J2K video packet 170a. The video packets 170a to 170d may be included in a video PES which is multiplexed with other elementary streams and program streams in the MPEG-2 transport stream 102.

The J2K video access unit 171a includes encoded J2K video data 173a and an ELSM header 172a. The J2K video data 173a in the J2K access unit 171a, before it is encoded, may be referred to as J2K image data. The J2K image data encoded in the J2K video access unit 171a may be associated with a single frame or a still picture of J2K image data. A J2K video access unit, such as J2K video access unit 171a, is a unit of encoded J2K image data for a complete frame in a video or a still picture. The J2K video access unit 171a also includes parameters in the ELSM header 172a which may be used to decode the J2K access unit 171a and to display the decoded J2K image data. The information in the J2K video descriptor 162 and the ELSM header 172a both reference the J2K video data 173a, but in different ways. In comparison with the information in the J2K video descriptor 162, the ELSM header 172a in the J2K access unit 171 contains relatively low level video-centric data for decoding and displaying the video data 173a as decoded J2K image data. As noted above, the information in the J2K video descriptor 162 is used to direct usage of the J2K access unit 171a in the J2K video packet 170a. This is a higher level referencing than in the ELSM header 172a. However, the J2K video descriptor 162 may include some of the same metadata parameters and information included in the ELSM header 172a about the J2K video data 173a. Thus, the J2K video descriptor 162 enables a higher level access to some of the information in the ELSM header 172a, without accessing all of the information about the J2K video data 173a included in the ELSM header 172a.

The MPEG-2 transport stream 102 including video packets, such as video packets 170a to 170d including J2K video access units, may be used in client/server communications (e.g., the Internet, Image database, video streaming, video server, etc.) distributing cinema and for the exchange of content as well as the contribution of content to service providers. It may also be used in entertainment services and over broadband services utilizing satellites, cable system, 3DTV systems and IPTV systems. The MPEG-2 transport stream 102 including J2K video access units, such as J2K video access unit 171a, may also be used in satellite imaging systems, medical imaging systems, systems for high-quality frame-based video recording, editing and storage, digital cinema systems, high quality video (2D and 3DTV) contribution systems to distribution points and systems used for imaging weather or astronomical recording.

2. Encoding and Decoding Systems

Figure 2:
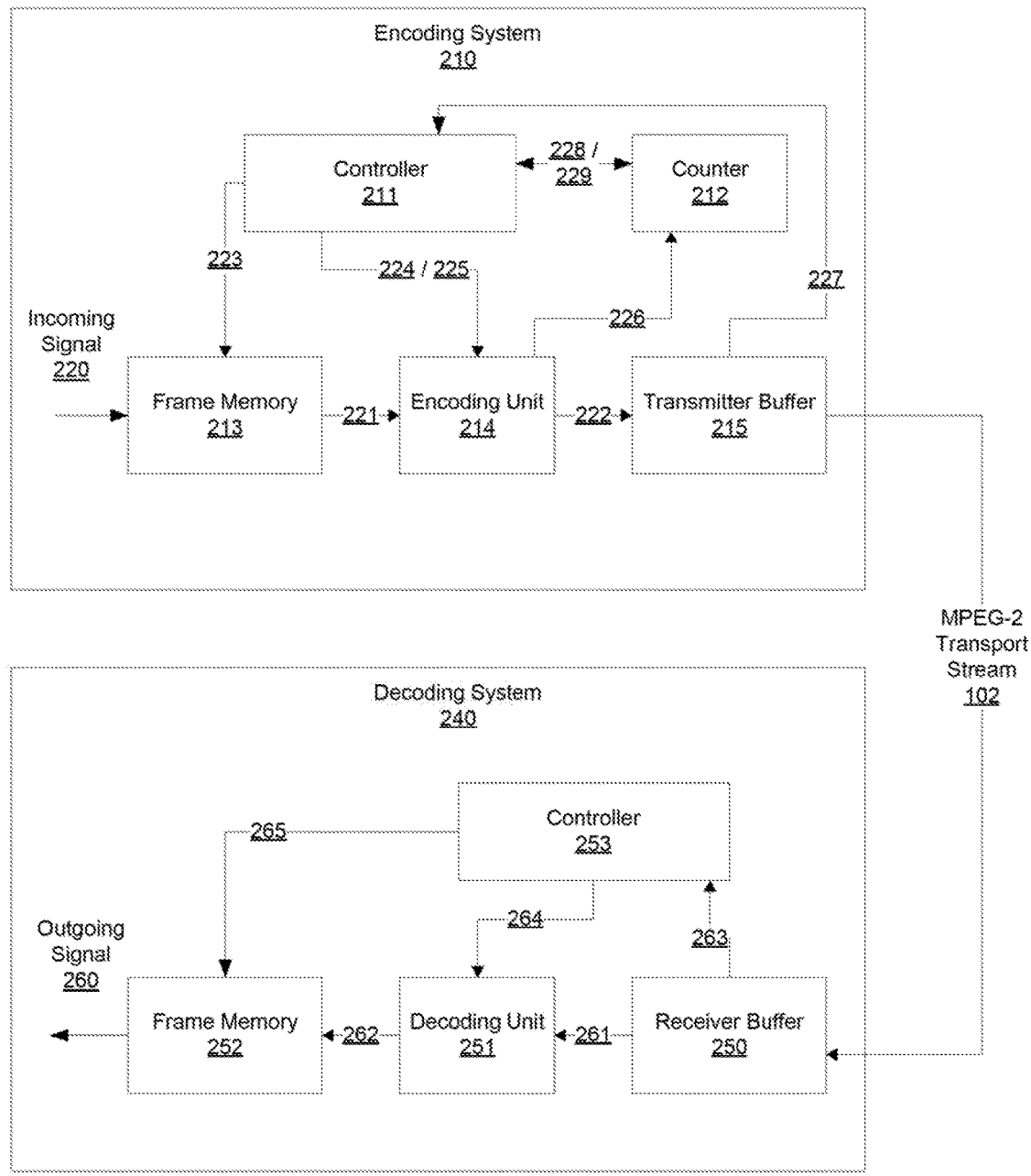
FIG. 2 is a block system diagram illustrating an encoding system 210 and a decoding system 240, according to different embodiments.

FIG. 2 illustrates the encoding system 210 and the decoding system 240, according to an embodiment. The decoding system 240 is representative of any of the CPEs or client devices discussed above with respect to FIG. 1A. In FIG. 2, there is block diagram illustrating an encoding system 210 delivering the MPEG-2 transport stream 102 to the decoding system 240, according to an embodiment. The encoding system 210 includes a controller 211, a counter 212, a frame memory 213, an encoding unit 214 and a transmitter buffer 215. The decoding system 240 includes a receiver buffer 250, a decoding unit 251, a frame memory 252 and a controller 253. The encoding system 210 and the decoding system 240 are coupled to each other via a transmission path including the MPEG-2 transport stream 102. The controller 211 of the encoding system 210 controls the amount of data to be transmitted on the basis of the capacity of the receiver buffer 250 and may include other parameters such as the amount of data per a unit of time. The controller 211 controls the encoding unit 214, to prevent the occurrence of a failure of a received signal decoding operation of the decoding system 240. The controller 211 may include, for example, a microcomputer having a processor, a random access memory and a read only memory.

An incoming signal 220 supplied from, for example, a video camera recording J2K digital images, which are input to the frame memory 213. The frame memory 213 has a first area used for storing the incoming signal 220 from the video camera, and a second area used for reading out the stored signal and outputting it to the encoding unit 214. The controller 211 outputs an area switching control signal 223 to the frame memory 213. The area switching control signal 223 indicates whether the first area or the second area is to be used.

The controller 211 outputs an encoding control signal 224 to the encoding unit 214. The encoding control signal 224 causes the encoding unit 214 to start an encoding operation. In response to the encoding control signal 224 from the controller 211, including control information such as the information referenced in the J2K video descriptor 162 and/or the ELSM header 172a, the encoding unit 214 starts to read out the video signal to a high-efficiency encoding process, such as an interframe coding process or a discrete cosine transform to encode the J2K image data to form J2K video access units. Each J2K video access unit, such a J2K access unit 171a, includes an ELSM header, such a ELSM header 172a. A ELSM header generally includes metadata about a J2K access unit which is used to assist in decoding and displaying the J2K image data in from encoded J2K video data. According to an embodiment, the control signal includes the J2K video descriptor information and may include other video metadata parameters. As described above, the J2K video descriptor includes information associated with the J2K video access unit. It may also include information associated with a J2K video sequence, a J2K still picture or both.

A table containing metadata fields in an exemplary J2K video descriptor is demonstrated in Table I below.

TABLE I

| Table I - J2K Video Descriptor Syntax | No. Of bits | Mnemonic |
|---|---|---|
| J2K_video_descriptor( ) { | | |
| descriptor_tag | 8 | uimsbf |
| descriptor_length | 8 | uimsbf |
| profile_and_level | 16 | uimsbf |
| horizontal_size | 32 | uimsbf |
| vertical_size | 32 | uimsbf |
| max_bit_rate | 32 | uimsbf |
| max_buffer_size | 32 | uimsbf |
| DEN_frame_rate | 16 | uimsbf |
| NUM_frame_rate | 16 | uimsbf |
| color_specification | 8 | bslbf |
| still_mode | 1 | bslbf |
| interlaced_video | 1 | bslbf |
| reserved | 6 | bslbf |
| private_data_byte | 8 | bslbf |

The fields in the exemplary J2K video descriptor of Table I are now described for illustrative purposes.

Profile_and_Level may be coded to indicate broadcast profile and level values associated with the J2K access unit and the video sequence that are part of the program. These parameters are defined in the J2K video standard and are also included in the J2K video descriptor as this is the interoperability point between encoding system 210 and the decoding system 240. For example—a decoder that cannot support a particular profile and level will not attempt to decode the J2K video access unit.

Horizontal_size may be coded to correspond with a horizontal size parameter in a J2K codestream (ELSM) header for a code stream in the J2K video access unit.

Vertical_size may be coded to correspond with a vertical size parameter in a J2K codestream (ELSM) header for a code stream in the J2K video access unit.

Max_bit_rate may be coded to express the maximum compressed bit rate value for the profile and level specified.

Max_buffer_size may be coded to express the maximum buffer size value for the profile and level specified.

DEN_frame_rate and NUM_frame_rate are fields for coding a J2K frame rate derived from the DEN_frame_rate and NUM_frame_rate values.

The encoding unit 214 prepares an encoded video signal 222 in a packetized elementary stream (PES) including video packets 160 and program information packets 170. The encoding unit 214 maps the video access units into video packets 160 using a program time stamp (PTS) and the control information. The PTS and the control information are also associated with the program information packet 170 which is associated with a corresponding video packet 160. The encoded video signal 222 is stored in the transmitter buffer 214 and the information amount counter 212 is incremented to indicate the amount of data in the transmitted buffer 215. As data is retrieved and removed from the buffer, the counter 212 is decremented to reflect the amount of data in the buffer. The occupied area information signal 226 is transmitted to the counter 212 to indicate whether data from the encoding unit 214 has been added or removed from the transmitted buffer 215 so the counter 212 can be incremented or decremented. The controller 211 controls the production of packets produced by the encoding unit 214 on the basis of the occupied area information 226 communicated in order to prevent an overflow or underflow from taking place in the transmitter buffer 215.

The information amount counter 212 is reset in response to a preset signal 228 generated and output by the controller 211. After the information counter 212 is reset, it counts data output by the encoding unit 214 and obtains the amount of information which has been generated. Then, the information amount counter 212 supplies the controller 211 with an information amount signal 229 representative of the obtained amount of information. The controller 211 controls the encoding unit 214 so that there is no overflow at the transmitter buffer 215.

The receiver buffer 250 of the decoding system 240 may temporarily store the PES with encoded data received from the encoding system 210 via the MPEG-2 transport stream 102. The decoding system 240 counts the number of frames of the received data, and outputs a frame number signal 263 which is applied to the controller 253. The controller 253 supervises the counted number of frames at a predetermined interval, for instance, each time the decoding unit 251 completes the decoding operation.

When the frame number signal 263 indicates the receiver buffer 250 is at a predetermined capacity, the controller 253 outputs a decoding start signal 264 to the decoding unit 251. When the frame number signal 263 indicates the receiver buffer 250 is at less than a predetermined capacity, the controller 253 waits for the occurrence of the situation in which the counted number of frames becomes equal to the predetermined amount. When the frame number signal 263 indicates the receiver buffer 250 is at the predetermined capacity, the controller 253 outputs the decoding start signal 264. The video access units are decoded in a monotonic order (i.e., increasing or decreasing) based on a presentation time stamp (PTS) in the header of the program information packets 170 and the ELSM header 151 of the video packets 160 associated with corresponding program information packets 170.

In response to the decoding start signal 264, the decoding unit 251 decodes data amounting to one frame from the receiver buffer 250, and outputs the data. The decoding unit 251 writes a decoded video signal 262 into the frame memory 252. The frame memory 252 has a first area into which the decoded video signal is written, and a second area used for reading out the decoded video data and outputting it to a monitor or the like.

3. Methods

Figure 3A:
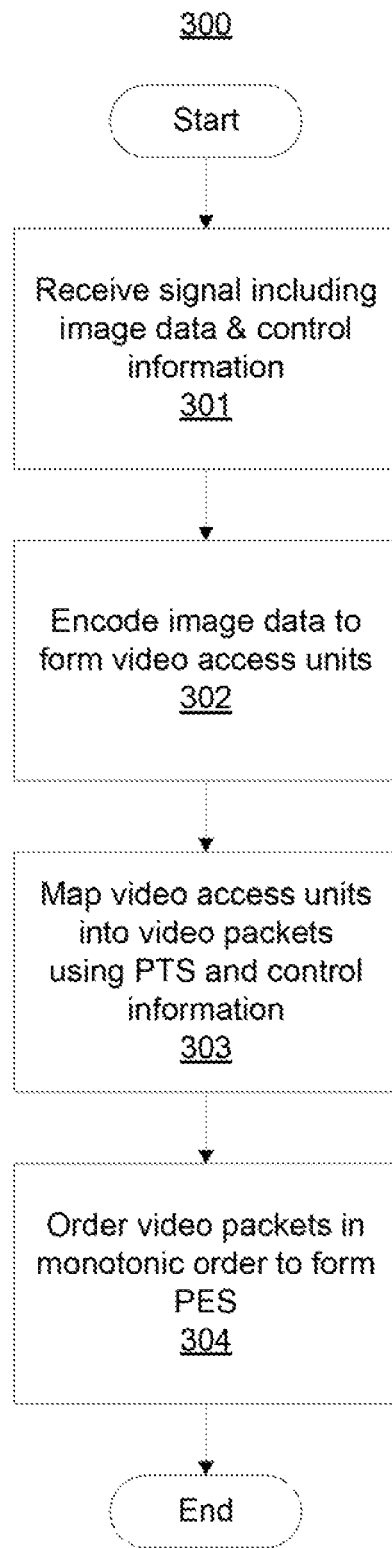
FIG. 3A is a flowchart illustrating a method of encoding 300 using the encoding system 210 shown in FIG. 2, according to an embodiment.

FIG. 3A illustrates a method 300 according to embodiment, for encoding J2K video data in a PES in MPEG-2 transport stream 102. The PES may be a J2K video elementary stream including J2K video access units in video packets. The method is described with respect to the encoding system 210 shown in FIG. 2 by way of example and not limitation. The method may be performed in other systems. The steps of the methods may be performed in a different sequence or one or more may be omitted.

At step 301, the encoding system 210 receives an incoming signal 220 including frames of J2K image data as well as metadata such as control information to generate other parameters for transport. These parameters may include interleaving or mixing program information packets and video packets, described further below with respect to step 304.

At step 302, the encoding system 210 encodes the frames of J2K image data to form J2K video access units. Each J2K video access unit includes an ELSM header. The MPEG-2 transport stream also includes a program information packet with a J2K video descriptor with video metadata parameters that may also be included in the ELSM header. The J2K video descriptor also includes other parameters that are needed to convey information about the video sequence and application usages. The J2K video descriptor includes information, such as described in table 1 above, associated with the J2K video access unit and either a video sequence or a still picture. The J2K video access unit also includes a PES header including timing reference information, including the PTS, which identifies a time associated with the encoding and/or decoding of the J2K video access unit. Also, the J2K video access unit includes one or more codestreams associated with a frame of the J2K image data. A codestream is a bit stream data associated with the frame of image data in the J2K video access unit.

At step 303, the encoding system 210 maps the J2K video access units into PES packets using the PTS in the PES header of the J2K video access units.

At step 304, the encoding system 210 creates the video packets which may be mixed with program information packets and then orders these packets as PES packets in a monotonic order using the PTS in the PES packets to form a PES. The PES may be incorporated into the MPEG-2 transport stream 102 using a multiplexer.

Figure 3B:
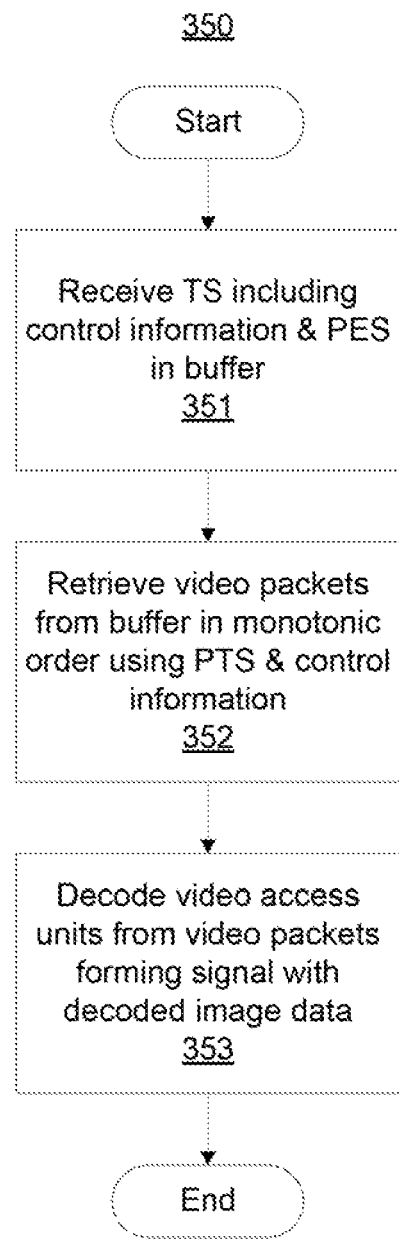
FIG. 3B is a flowchart illustrating a method of decoding 350 using the decoding system 240 shown in FIG. 2, according to an embodiment.

FIG. 3B illustrates a method 350 according to embodiment, for decoding video data in a PES. The decoding method is described with respect to the decoding system 240 shown in FIG. 2 by way of example and not limitation. The method may be performed in other systems.

At step 351, the decoding system 240 receives the PES in a receiver buffer 250 and extracts the video packets and the program information packets. The video packets in the PES includes the J2K image data in J2K video access units. Each J2K video access unit includes an ELSM header and the MPEG-2 transport stream also includes program information packets including the J2K video descriptor including the control information including video metadata parameters associated with application specific functions including the image data such as display, slide shows, etc. The J2K video descriptor may also include information in common with the ELSM header associated with the J2K video access unit relating to the J2K video data as being a video sequence, a still picture or both. The PES headers for the video packets also includes timing reference information including a PTS, and one or more codestreams associated with a frame of the image data.

At step 352, the decoding system 240 retrieves each J2K video access units present in the buffer in a monotonic order associated with the PTS in the PES header of the J2K video access unit.

At step 353, the decoding system 240 decodes the removed J2K video access units to form a signal including the decoded J2K image data.

4. Computer System for Executing Software

One or more of the steps and functions described herein and one or more of the components of the systems described herein may be implemented as computer code comprising computer readable instructions stored on a computer readable storage device, such as memory or another type of storage device. The computer code is executed on a computer system, such as computer system 400 described below by a processor, such as an application-specific integrated circuit (ASIC), or other type of circuit. The code may exist as software programs comprised of program instructions in source code, object code, executable code or other formats.

Figure 4:
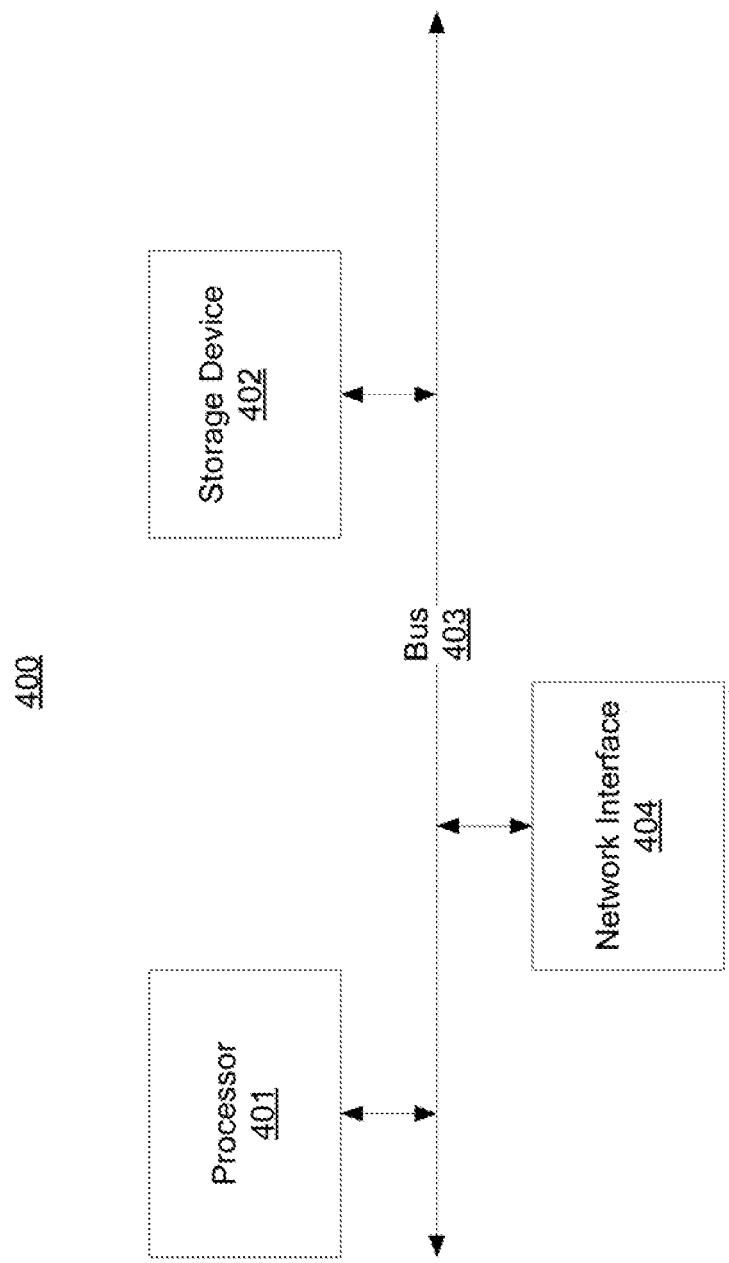
FIG. 4 is a block system diagram illustrating a computer system configured to provide a hardware platform for the encoding system 210 or the decoding system 240 shown in FIG. 2, according to different embodiments.

FIG. 4 shows a computer system 400 which may be used as a hardware platform for the encoding system 210 or the decoding system 240. Computer system 400 may be used as a platform for executing one or more of the steps, methods, and functions described herein that may be embodied as software stored on one or more computer readable storage devices, which are hardware storage devices.

The computer system 400 includes a processor 401, or processing circuitry, that may implement or execute software instructions performing some or all of the methods, functions and other steps described herein. Commands and data from processor 401 are communicated over a communication bus 403. Computer system 400 also includes a computer readable storage device 402, such as random access memory (RAM), where the software and data for processor 401 may reside during runtime. Storage device 402 may also include non-volatile data storage. Computer system 400 may include a network interface 404 for connecting to a network. It is apparent to one of ordinary skill in the art that other known electronic components may be added or substituted in computer system 400.

A PES including J2K access units overcomes the above described interoperability limitations associated with previous protocols and standards in transporting J2K image data in a PES, such as may be included in the MPEG-2 transport stream 102. The MPEG-2 transport stream 102 including J2K access units in video packets 160 may be used in client/server communications (e.g., the Internet, Image database, video streaming, video server, etc.) distributing cinema and for the exchange of content as well as the contribution of content to service providers. It may also be used in entertainment services and over broadband services utilizing satellites, cable systems, 3DTV systems and IPTV systems. The MPEG-2 transport stream 102 including J2K access units, such as J2K video access unit 171a, may also be used in satellite imaging systems, medical imaging systems, systems for high-quality frame-based video recording, editing and storage, digital cinema systems, high quality video (2D and 3DTV) contribution systems to distribution points and systems used for imaging weather or astronomical recordings.

Furthermore, the systems and methods described herein are generally described with respect to an encoding system or decoding system for J2K video access units in a video elementary stream. However, the systems and methods are applicable to encoding or decoding other types of data formats for other types of information streams.

While the embodiments have been described with reference to examples, those skilled in the art are able to make various modifications to the described embodiments without departing from the scope of the embodiments as described in the following claims, and their equivalents.

What is claimed is:

1. A method of decoding JPEG 2000 (J2K) video elementary streams carried in transport streams, the method comprising:
receiving a transport stream including a J2K video elementary stream including J2K video access units, each J2K video access unit including
an elementary stream (ELSM) header including video-related parameters associated with decoding and displaying image data associated with the J2K video access unit,
a packetetized elementary stream (PES) header including timing reference information including a presentation time stamp (PTS), and
one or more codestreams associated with each J2K video access unit;

retrieving each J2K video access unit, present in the J2K video elementary stream in a monotonic order; and decoding the retrieved video access unit using the video-related parameters to form a signal including decoded J2K image data.

2. The decoding method of claim 1, wherein the J2K video elementary stream is a JPEG 2000 Part 1 (J2K) packetized elementary stream (PES) with a succession of the J2K video access units.

3. The decoding method of claim 2, wherein the PES is a J2K video sequence that includes one or more of the J2K video access units having one or more matching image data metadata parameters in the ELSM header of the J2K video access units.

4. The decoding method of claim 2, wherein packets in the PES have an MPEG-2 Part 1 container format.

5. The decoding method of claim 1, wherein one or more of the video-related parameters are encoded in a video descriptor including video component parameters configured to enable a high level acquisition of a video component.

6. The decoding method of claim 5, wherein the video component parameters are configured to associate the video component with a program in the transport stream.

7. The decoding method of claim 1, wherein the video-related parameters include a parameter identifying a profile and level associated with each video access unit.

8. The decoding method of claim 1, wherein the video-related parameters include a parameter identifying a time code associated with each video access unit.

9. The decoding method of claim 1, wherein the video-related parameters include a parameter identifying a frame count associated with each video access unit.

10. The decoding method of claim 1, wherein the video-related parameters include a parameter identifying whether the video data is interlaced video.

11. The decoding method of claim 1, wherein the video metadata parameters comprise a parameter identifying whether the video data is formatted 3D content.

12. A decoding system configured to decode JPEG 2000 (J2K) video elementary streams carried in transport streams, the system comprising:

a processor configured to:

receive a transport stream carrying a J2K video elementary stream including J2K video access units, wherein each J2K video access unit includes:

an elementary stream (ELSM) header with video-related parameters for decoding the access unit, and a packetized elementary stream (PES) header including timing reference information including a presentation time stamp (PTS);

wherein the J2K video access units are ordered in the J2K video elementary stream in a monotonic display order;

decode the J2K video access units using the video-related parameters included in each J2K video access unit to form a signal including decoded J2K image data; and a storage buffer in communication with said processor, said storage buffer configured to buffer the J2K video access units and video-related parameters.

13. The decoding system of claim 12, wherein the J2K video elementary stream is a JPEG 2000 Part 1 (J2K) packetized elementary stream (PES) with a succession of the J2K video access units.

14. The decoding system of claim 13, wherein the J2K video sequence includes one or more of the J2K video access units having one or more matching image data metadata parameters in the ELSM header of the J2K video access units.

15. The decoding system of claim 13, wherein the packets in the PES have an MPEG-2 Part 1 container format.

16. The decoding system of claim 12, wherein one or more of the video-related parameters are encoded in a video descriptor including video component parameters configured to enable a high level acquisition of a video component.

17. The decoding system of claim 16, wherein the video component parameters are configured to associate the video component with a program in the transport stream.

18. The decoding system of claim 12 wherein the video-related parameters include a parameter identifying a profile and level associated with each video access unit.

19. The decoding system of claim 12, wherein the video-related parameters include a parameter identifying a time code associated with each video access unit.

20. The decoding system of claim 12, wherein the video-related parameters include a parameter identifying a frame count associated with each video access unit.

21. The decoding system of claim 12, wherein the video-related parameters include a parameter identifying whether the video data is interlaced video.

22. The decoding system of claim 12, wherein the video metadata parameters comprise a parameter identifying whether the video data is formatted 3D content.

* * * * *

UNITED STATES PATENT AND TRADEMARK OFFICE
CERTIFICATE OF CORRECTION

PATENT NO. : 10,148,973 B2  
APPLICATION NO. : 15/782916  
DATED : December 4, 2018  
INVENTOR(S) : Mandayam Narasimhan Page 1 of 1

It is certified that error appears in the above-identified patent and that said Letters Patent is hereby corrected as shown below:

On the Title Page

In the "Related U.S. Application Data" section (appearing on page 1 and continuing onto page 2):
After the Item (63) section, insert an Item (60) section with the following information:
--Provisional Application No. 61/287,759, filed on Dec. 18, 2009.--

Signed and Sealed this
Twenty-fifth Day of August, 2020

Andrei Iancu
*Director of the United States Patent and Trademark Office*